(12) United States Patent
Rodriguez

(10) Patent No.: US 11,961,315 B1
(45) Date of Patent: Apr. 16, 2024

(54) METHODS AND SYSTEMS FOR ENHANCING DETECTION OF A FRAUDULENT IDENTITY DOCUMENT IN AN IMAGE

(71) Applicant: Daon Technology, Dublin (IE)

(72) Inventor: Raphael A Rodriguez, Marco Island, FL (US)

(73) Assignee: Daon Technology, Dublin (IE)

( * ) Notice: Subject to any disclaimer, the term of this patent is extended or adjusted under 35 U.S.C. 154(b) by 0 days.

(21) Appl. No.: 18/529,737

(22) Filed: Dec. 5, 2023

(51) Int. Cl.
*G06K 9/00* (2022.01)
*B42D 25/30* (2014.01)
(Continued)

(52) U.S. Cl.
CPC ............ *G06V 20/95* (2022.01); *B42D 25/30* (2014.10); *G06F 21/602* (2013.01); *G06Q 20/40* (2013.01); *G06T 7/0002* (2013.01); *G06T 7/20* (2013.01); *G06T 7/62* (2017.01); *G06T 7/70* (2017.01); *G06V 30/40* (2022.01); *G06V 30/41* (2022.01);
(Continued)

(58) Field of Classification Search
CPC ........ G06V 20/95; G06V 30/40; G06V 30/41; G06V 30/413; G06V 30/418; G06V 30/42; G06V 40/40; G06T 7/0002; G06T 7/20; G06T 7/60; G06T 7/62; G06T 7/70; G06T 2207/30176; G06F 21/30; G06F 21/31; G06F 21/32; G06F 21/36; G06F 21/60; G06F 21/602; G07D 7/00; G07D 7/003; G07D 7/004; G07D 7/005; G07D 7/0051; G07D 7/0053; G07D 7/202;
G07D 7/2033; G06Q 20/40; G06Q 20/401; G06Q 20/4012; G06Q 20/4014; G06Q 20/40145; B42D 25/23; B42D 25/24; B42D 25/30; B42D 25/305; B42D 25/309; H04N 2201/3225; H04N 2201/3226; H04N 2201/3228; H04N 2201/323; H04N 2201/3233; H04N 2201/3235; H04N 2201/3236; H04N 2201/3239; H04N 2201/3252
See application file for complete search history.

(56) References Cited

U.S. PATENT DOCUMENTS 10,936,857 B2 * 3/2021 Benkreira ............ G06V 30/416
10,936,866 B2 * 3/2021 Berger .................. G06V 20/80
(Continued)

*Primary Examiner* — Eric Rush
(74) *Attorney, Agent, or Firm* — Kevin McDermott, Esq.

(57) ABSTRACT

A method for enhancing detection of a fraudulent identity document in an image is provided that includes receiving, by an electronic device, an image of an identity document associated with a user including at least one background object. The method also includes determining the size and orientation of the at least one background object based on the received image, extracting information about the received image from the received image, and extracting information from the received image about a capture device that captured the received image. Each of the size and orientation of the at least one background object, the extracted received image data information, and the extracted capture device information is compared against corresponding information in record data of the user. A similarity score is calculated for each comparison. When each similarity score satisfies a threshold value, the identity document in the received image is deemed to be fraudulent.

20 Claims, 3 Drawing Sheets

(51) Int. Cl.
*G06F 21/60* (2013.01)
*G06Q 20/40* (2012.01)
*G06T 7/00* (2017.01)
*G06T 7/20* (2017.01)
*G06T 7/62* (2017.01)
*G06T 7/70* (2017.01)
*G06V 20/00* (2022.01)
*G06V 30/40* (2022.01)
*G06V 30/41* (2022.01)
*G06V 30/418* (2022.01)
*G06V 40/40* (2022.01)

(52) U.S. Cl.
CPC ............ *G06V 30/418* (2022.01); *G06V 40/40* (2022.01); *G06T 2207/30176* (2013.01); *H04N 2201/3235* (2013.01); *H04N 2201/3239* (2013.01)

(56) References Cited

U.S. PATENT DOCUMENTS

| | | | | |
|---|---|---|---|---|
| 2018/0012094 | A1* | 1/2018 | Wu | G06T 7/90 |
| 2020/0410074 | A1* | 12/2020 | Dang | G06V 30/413 |
| 2023/0281821 | A1* | 9/2023 | Pizzocchero | G06V 10/22 |
| | | | | 382/100 |

* cited by examiner

METHODS AND SYSTEMS FOR ENHANCING DETECTION OF A FRAUDULENT IDENTITY DOCUMENT IN AN IMAGE

BACKGROUND OF THE INVENTION

This invention relates generally to authenticating identity documents, and more particularly, to methods and systems for enhancing detection of a fraudulent identity document in an image.

Individuals conduct transactions with many different service providers in person and remotely over the Internet. Network-based transactions conducted over the Internet may involve, for example, opening a bank account or similar account using a website or mobile application. Service providers typically require successfully identifying an individual before he or she is permitted to open a bank account or conduct any other type of network-based transaction involving sensitive information.

Service providers typically require individuals to upload an image of his or her identity document, like a driver's license or a passport, and a claim of identity to facilitate authentication. The uploaded images are typically analyzed to determine whether the identity document in the uploaded image is authentic, jurisdictionally accurate, and unexpired. The analysis may be manual or automatic.

Imposters, criminal enterprises, and perhaps some governments have been known to impersonate individuals by providing a false claim of identity supported by a fraudulent identity document when attempting to deceive a service provider into concluding the imposter is the person he or she claims to be. Such impersonations are known as spoofing. Additionally, such parties have been known to use many methods to obtain or create fraudulent identity documents. Images of the fraudulent documents can be uploaded by any of these parties, for example, when attempting to open a bank account. The fraudulent identity document images may be of such high quality that it is almost impossible to distinguish the identity documents therein from genuine identity documents using known techniques. Consequently, opening a banking account or other type of similar account with an uploaded image of an identity document captured at a remote location depends on verifying the identity document in the uploaded image is authentic.

Known methods for determining the authenticity of an identity document included in an image may analyze various features of the document, for example, the text font, presence of security features, and color spectrum, and may verify the uploaded image was not taken of a photocopy. The features may be analyzed manually or automatically.

However, manually reviewing uploaded identity documents is slow, inefficient, not scalable, and very expensive. Additionally, known methods of automatically analyzing identity documents typically generate results that are not as accurate and trustworthy as desired.

Thus, it would be advantageous and an improvement over the relevant technology to provide a method and an electronic device capable of enhancing detection of a fraudulent identity document in an image, enhancing security, facilitating a reduction in identity document review costs, and facilitating a reduction in costs incurred due to successful spoofing attacks.

BRIEF DESCRIPTION OF THE INVENTION

An aspect of the present disclosure provides a method for enhancing detection of a fraudulent identity document in an image is provided that includes receiving, by an electronic device, an image of an identity document associated with a user including at least one background object. The method also includes determining the size and orientation of the at least one background object based on the received image, extracting information about the received image from the received image, and extracting information from the received image about a capture device that captured the received image.

Each of the size and orientation of the at least one background object, the extracted received image data information, and the extracted capture device information is compared against corresponding information in record data of the user. Furthermore, the method includes calculating a similarity score for each comparison and determining whether each similarity score satisfies a threshold value. In response to determining each similarity score satisfies the threshold value, the method includes deeming the identity document in the received image to be fraudulent.

In one embodiment of the present disclosure the method includes deeming the identity document in the received image to be genuine in response to determining at least one of the similarity scores fails to satisfy the threshold value.

In another embodiment of the present disclosure the method includes extracting at least one of: latitudinal and longitudinal coordinates of the received image, a time zone in which the received image was captured, a time stamp indicating the date and time the received image was captured, and metadata associated with the content and context of the received image.

In yet another embodiment of the present disclosure the method includes extracting at least one of a type and model of the image capture device used to capture the received image, positional information of the image capture device during capture of the received image, movement information of the image capture device during capture of the received image, and environmental conditions during capture of the received image.

In another embodiment of the present disclosure the method includes storing the size and orientation of the at least one background object, the extracted received image information, and the extracted captured device information.

In another embodiment of the present disclosure the method includes identifying the at least one background object.

In another embodiment of the present disclosure the method includes calculating a cryptographic image hash of the received image, comparing the calculated cryptographic image hash against a record cryptographic image hash of the user, and determining the received image is a replay of the record image when the hashes match.

In another embodiment of the present disclosure the method includes extracting environmental data, location data, movement data, imaging data, audio data, proximity data, magnetic data, power data, and storage data from sensors in the capture device, wherein the extracted data was captured by the capture device while capturing the received image.

In yet another embodiment of the present disclosure the extracted received image information includes spatial data and color information, and the extracted capture device information includes a type of capture device.

Another aspect of the present disclosure provides an electronic device for enhancing detection of a fraudulent identity document in an image including a processor and a memory configured to store data. The electronic device is associated with a network and the memory is in communication with the processor and has instructions stored thereon which, when read and executed by the processor, cause the electronic device to receive an image of an identity document associated with a user including at least one background object, and to determine the size and orientation of the at least one background object based on the received image. Moreover, the instructions when read and executed by the processor cause the electronic device to extract information about the received image from the received image and extract information from the received image about a capture device that captured the received image.

Furthermore, the instructions when read and executed by the processor cause the electronic device to compare each of the size and orientation of the at least one background object, the extracted received image information, and the extracted capture device information against corresponding information in record data of the user. The instructions when read and executed by the processor further cause the electronic device to calculate a similarity score for each comparison and to determine whether each similarity score satisfies a threshold value. In response to determining each similarity score satisfies the threshold value, the instructions when read and executed by the processor cause the electronic device to deem the identity document in the received image to be fraudulent.

In an embodiment of the present disclosure, the instructions when read and executed by the processor, further cause the electronic device to deem the identity document in the received image to be genuine in response to determining at least one of the similarity scores fails to satisfy the threshold value.

In another embodiment of the present disclosure, the extracted received image information includes at least one of latitudinal and longitudinal coordinates of the received image, a time zone in which the received image was captured, a time stamp indicating the date and time the received image was captured, and metadata associated with the content and context of the received image.

In yet another embodiment of the present disclosure the extracted captured device information includes at least one of a type and model of the image capture device used to capture the received image, positional information of the image capture device during capture of the received image, movement information of the image capture device during capture of the received image, and environmental conditions during capture of the received image.

In another embodiment of the present disclosure, the instructions when read and executed by the processor, further cause the electronic device to store the size and orientation of the at least one background object, the extracted received image data information, and the extracted captured device information.

In another embodiment of the present disclosure, the instructions when read and executed by the processor, further cause the electronic device to identify the at least one background object from the size and orientation of the at least one background object.

In another embodiment of the present disclosure, the instructions when read and executed by the processor, further cause the electronic device to calculate a cryptographic image hash of the received image, compare the calculated cryptographic image hash against a record cryptographic image hash of the user, and determine the received image is a replay of the record image when the hashes match.

In another embodiment of the present disclosure, the instructions when read and executed by the processor, further cause the electronic device to extract environmental data, location data, movement data, imaging data, audio data, proximity data, magnetic data, power data, and storage data from the sensors, wherein the extracted data was captured by the capture device while capturing the received image.

In another embodiment of the present disclosure, the extracted received image information includes spatial data and color information, and the extracted capture device information includes a type of capture device.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
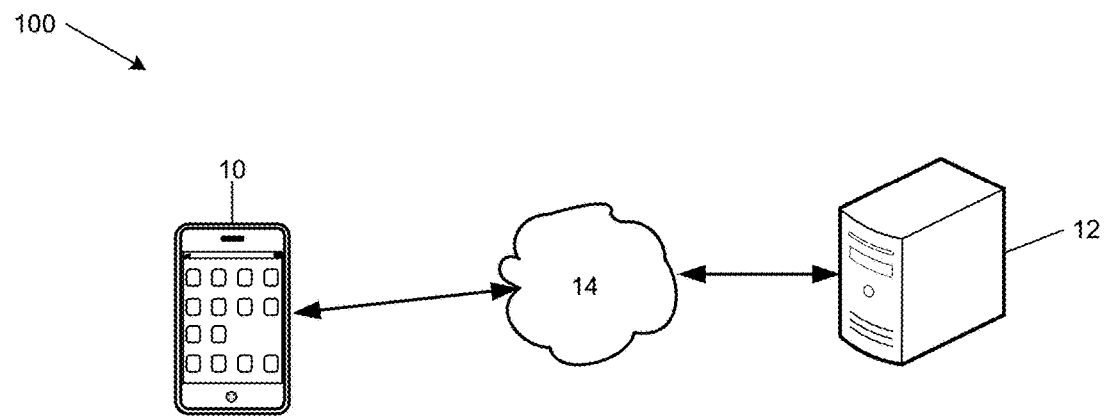
FIG. 1 is a schematic diagram of an example computing system for enhancing detection of a fraudulent identity document in an image according to an embodiment of the present disclosure.

FIG. 1 is a schematic diagram of an example computing system 100 for enhancing detection of a fraudulent identity document in an image according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may be any type of server or computer implemented as a network server or network computer. Other examples include, but are not limited to, a cellular phone, any wireless hand-held consumer electronic device, a smart phone, a tablet computer, a phablet computer, a laptop computer, and a personal computer (PC).

The electronic device 10 may be associated with a single person who operates the device. The person who is associated with and operates the electronic device 10 is referred to herein as a user.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
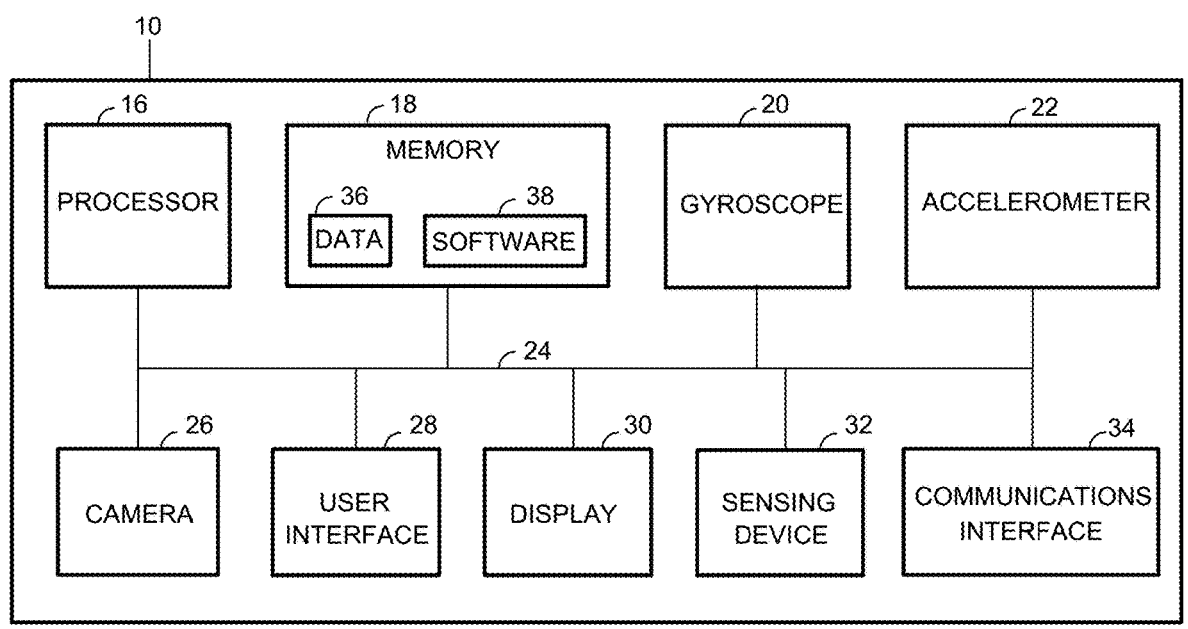
FIG. 2 is a more detailed schematic diagram illustrating an example electronic device in the system of FIG. 1.

FIG. 2 is a diagram of the example electronic device 10 used for enhancing detection of a fraudulent identity document in an image according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of users and a database of images in which each image is of an identity document. Each data record is typically for a respective user. The data record for each user may include data such as, but not limited to, the user's name, personal data, and images of identity documents associated with the user, and cryptographically hashed identity document images. Images as described herein can be a digital picture taken, for example, with a camera or a smart device including a camera. Moreover, the data record for each user may include the size and orientation of one or more background objects included in images of identity documents, information extracted from one or more images, and information about the device that captured one or more of the images. Identity documents include, but are not limited to, passports, driver's licenses, and identity cards. The data may be securely stored in the memory 18.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein.

Application programs are software and include, but are not limited to, operating systems, Internet browser applications, enrolment applications, authentication applications, user liveness detection applications, machine learning models that facilitate determining whether identity documents included in image data are authentic, secure cryptographic algorithms, for example, SHA-256, and any special computer program that manages the relationship between application software and any suitable variety of hardware that helps to make-up a computer system or computing environment.

Authentication applications enable the electronic device 10 to conduct user verification and identification (1:N) transactions with any type of authentication data, where "N" is a number of candidates. Application programs may also include, for example, Computer Vision software applications that can detect and accurately identify background objects in an image, calculate the location of each background object in the image using Cartesian coordinates, and calculate the pixel screen coverage of each background object in the image. Calculating the pixel screen coverage can include calculating the percentage of the total image area occupied by each background object. The identified background objects and associated calculated locations and pixel screen coverage can be compared against the corresponding data of users stored in one or more databases. The software may also include computer programs that implement buffers and use RAM to store temporary data.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either.

The camera 26 captures image data. As used herein, capture means to record data temporarily or permanently, for example, images of identity documents. The camera 26 can be one or more imaging devices configured to record images of identity documents of a user while utilizing the electronic device 10. Moreover, the camera 26 is capable of recording images under any lighting conditions including infrared light. The camera 26 may be integrated into the electronic device 10 as one or more front-facing cameras and/or one or more rear facing cameras that each incorporates a sensor, for example and without limitation, a CCD or CMOS sensor. Alternatively, the camera 26 can be external to the electronic device 10.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers.

The camera 26 can be considered a sensor in the electronic device 10. It is contemplated by the present disclosure that the electronic device 10 may include additional sensors (not shown) that may also capture data while the camera 26 captures image data. Such sensors include, but are not limited to, a sensor for detecting ambient light, a sensor for calculating global positioning coordinates (GPS) of the electronic device 10, and one or more magnetometers. For embodiments in which the camera 26 is external to the electronic device 10, such additional sensors may be included in the camera 26. Moreover, such an external camera 26 may include at least one microphone, speakers, accelerometers, and gyroscopes.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed or user entered information can be captured and stored in the memory 18.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet.TM. or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across a network between the electronic device 10 and any other device (not shown). The exchange of information may involve the transmission of radio frequency (RF) signals through an antenna (not shown).

The server 12 includes most of the same components as described herein with regard to the electronic device 10. However, because the server 12 is primarily stationary, not primarily mobile, the server 12 may not include the gyroscope 20 and/or the accelerometer 22.

Figure 3:
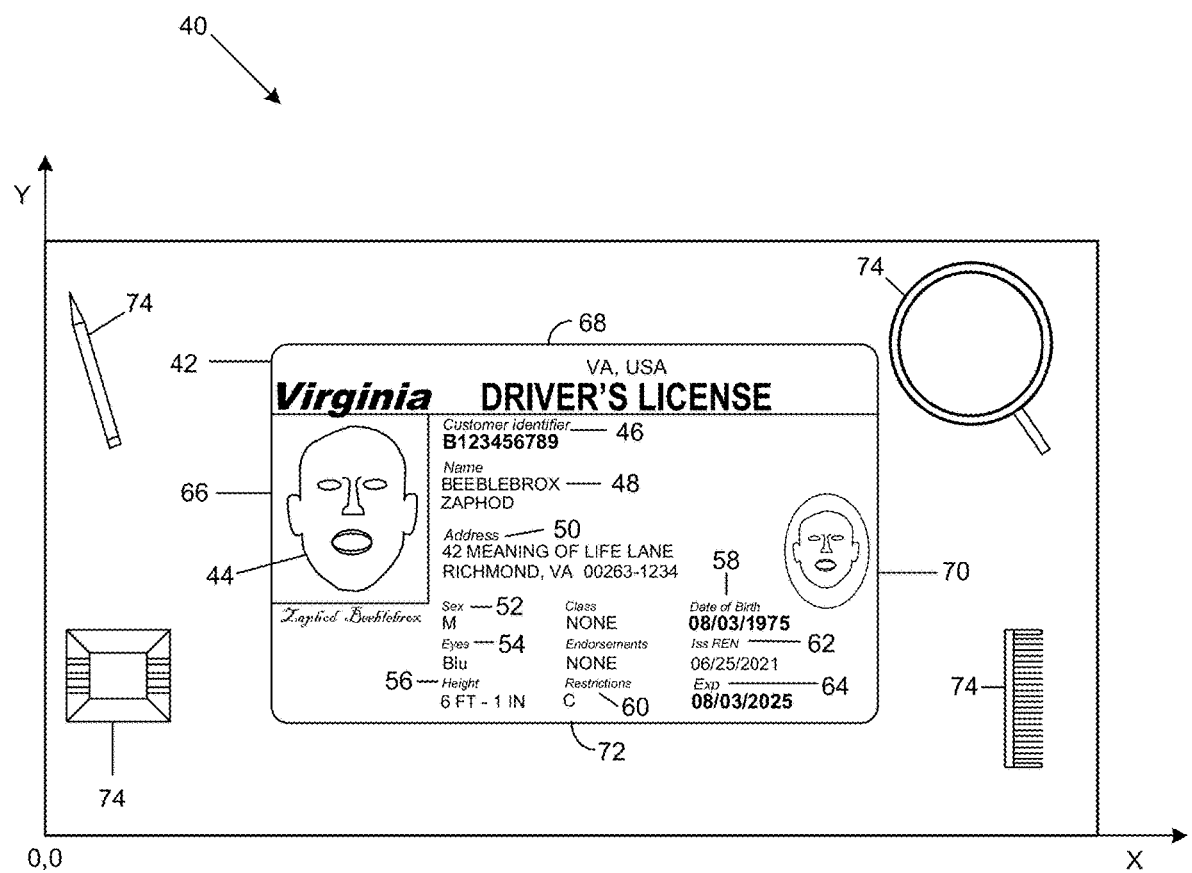
FIG. 3 is a diagram illustrating image data including an image of an example identity document and example background objects.

FIG. 3 is a diagram illustrating an image 40 including an example identity document 42. An example first side of the identity document 42 is shown. The example identity document 42 is a driver's license. However, it is contemplated by the present disclosure that the identity document 42 may alternatively be any identity document used by a person to prove a claim of identity, for example, a passport or an identification card. The image may be captured with the electronic device 10 or any other device included in the system 100 capable of communicating with the electronic device 10 and the server 12 via the network 14.

The identity document 42 includes an image 44 of the person to whom the identity document was issued and identifying information. Identifying information may include information about the person to whom the identity document 42 was issued as well as general information relating to the identity document 42. The identifying information can include, but is not limited to, a customer identifier 46 as well as the person's name 48, address 50, sex 52, eye color 54, height 56, and date of birth 58. Identity information can also include, but is not limited to, restrictions 60 the person is required to comply with while driving, the issue renewal date 62, the expiration date 64 of the identity document 42, and the state and/or country that issued the identity document 42. The identity information is typically in text which may be obtained or extracted from the identity document 42 using optical character recognition (OCR) techniques. The identity document 42 has a left edge 66, a top edge 68, a right edge 70, and a bottom edge 72.

Image 40 is frequently captured by users informally photographing their own identity documents 42. For example, users may photograph identity documents 42 positioned on the kitchen table, a dresser, a desk or a bureau. As a result, images 40 of identity documents 42 frequently include objects 74 in the background. A background object 74 may be any kind or type of object deliberately or accidentally included in the field of view of, for example, the camera 26 while capturing an image 40 of the identity document 42. For example, the background object 74 may be a coffee cup, comb, brush, sandwich, pen, pencil, computer, tool, weapon, or ash tray. The number of background objects 74 is not limited to the number and type shown. Rather, any number and type of background objects 74 may be included in the image 40 of the identity document 42.

A three-dimensional Cartesian coordinate system having an origin 0,0 and X and Y-axes may be mathematically superimposed on the image 40. More specifically, the origin 0,0 is positioned to coincide with a lower left-hand corner of the image 40. However, it is contemplated by the present disclosure that the origin 0,0 may be positioned at any location on the image 40 that enables accurately calculating the location of background objects 74 using Cartesian coordinates. Thus, the Cartesian coordinate system may be located at any position on the image 40. The coordinate system represents the two-dimensional space in which the background objects 74 may be located and may be used to locate each background object 74 using X,Y Cartesian coordinates.

Background objects 74 are typically irrelevant to analyzing the identity document 42 so are not used for analyzing the identity document 42. As a result, background objects 74 are typically removed from the image 40 by cropping the image 40 to include the identity document 42 only. However, it is contemplated by the present disclosure that information about background objects 74 may be used to enhance detection of a fraudulent identity document in an image. For example, Computer Vision software applications can be used to detect and accurately identify background objects 74 in the image 40 provided during an authentication transaction, calculate the location of each background object in the provided image 40 using Cartesian coordinates, and calculate the pixel screen coverage of each background object 74 in the provided image 40.

Calculating the pixel screen coverage can include calculating the percentage of the total image area occupied by each background object 74. The identified background objects 74 and associated calculated locations and pixel screen coverage can be compared against the corresponding data of users stored in one or more databases. When the background objects 74 and associated calculated locations and pixel screen coverage approximately match the corresponding data in a user record, the provided image can be deemed to be of a fraudulent identity document. However, when at least one of the background objects 74 and associated calculated locations and pixel screen coverage fail to approximately match the corresponding data in a user record, the provided image can be deemed to be of a genuine identity document.

Metadata can be information associated with the image 40 that is automatically generated by the electronic device 10 while capturing the image 40. The metadata can include information such as, but not limited to, information about the image 40 itself, information about environmental conditions while capturing the image 40, and information about the electronic device 10 while capturing the image 40. Information about the image 40 itself includes, but is not limited to, spatial data and color information. More specifically, information about the image 40 itself includes, but is not limited to, the latitudinal and longitudinal coordinates of the image 40, the time zone in which the image 40 was captured, a time stamp indicating a date and time the image 40 was captured, and information related to the content and context of the image 40. Information related to the content and context of the image 40 can include, but is not limited to, the resolution, pixel density, and image format of the image 40.

Information about the environmental conditions includes, but is not limited to, temperature, humidity, ambient light level, and atmospheric pressure.

Information about the electronic device 10 includes the type and/or model of the device used to capture the image 40. Moreover, information about the electronic device 10 may include positional information of the electronic device 10 during capture of the image 40, and movement information of the electronic device 10 during capture of the image 40. Positional information may include, but is not limited to, an angle from which the electronic device 10 captured the image 40, the height of the electronic device 10 above the identity document 42 during capture, the latitude and longitude of the electronic device 10 during capture, and the altitude of the electronic device 10 during capture.

Movement information may include, but is not limited to, acceleration, velocity, and orientation of the electronic device 10 with respect to the identity document 42 while capturing the image 40.

Service providers typically require individuals to upload an image of his or her identity document, like a driver's license or a passport, and a claim of identity to facilitate authentication. The uploaded image is typically analyzed to determine whether the identity document in the uploaded image is authentic. Imposters have been known to impersonate individuals by providing a false claim of identity supported by fraudulent identity documents when attempting to deceive a service provider into concluding the imposter is the person he or she claims to be. Additionally, impostors have been known to use many methods to obtain or create fraudulent identity documents. For example, imposters have been known to laminate another person's image onto their own identity document and to alter the text of another person's identity document. The imposters upload images of the altered documents, for example, when opening a bank account. However, such uploaded identity document images are frequently taken of fraudulent identity documents of such high quality that it is almost impossible to distinguish the fraudulent identity documents therein from genuine identity documents using known techniques.

Methods for automatically determining the authenticity of an identity document included in an image are known to analyze various features of the document. For example, such methods are known to analyze the text font to verify it comports with the appropriate standards for the respective class of document, determine whether security features are present, determine whether the color spectrum of the document is proper, and verify that the uploaded image was not taken of a photocopy. However, these methods generate less robust authenticity results than desired which can result in compromised security.

To address these problems the electronic device 10 may receive an image of an identity document associated with a user including one or more background objects. The electronic device can determine the size and orientation of the background objects based on the received image and can extract information about the received image from the received image. Moreover, the electronic device 10 can extract information from the received image about a capture device that captured the received image. Furthermore, the electronic device 10 can compare each of the size and orientation of the background objects, the extracted received image data information, and the extracted capture device information against corresponding information in record data of the user. The electronic device 10 can determine whether each comparison calculates a similarity score that satisfies a threshold value, and in response to determining each similarity score satisfies the threshold value, deem the identity document in the received image to be fraudulent.

Figure 4:
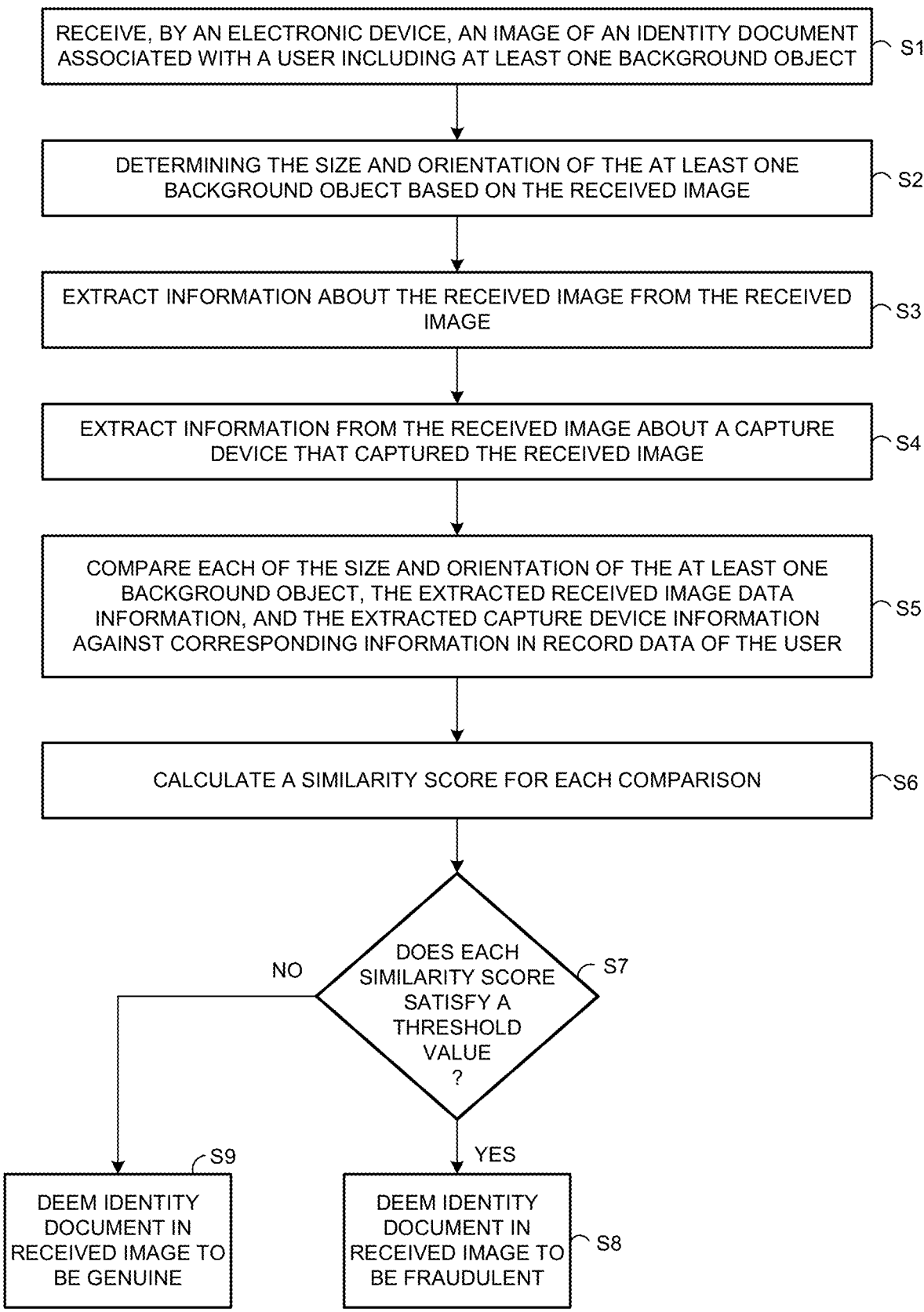
FIG. 4 is a diagram illustrating an example method and algorithm for enhancing detection of a fraudulent identity document in an image according to an embodiment of the present disclosure.

FIG. 4 is a flowchart illustrating an example method and algorithm for enhancing detection of a fraudulent identity document in an image according to an embodiment of the present disclosure. FIG. 4 illustrates example steps performed when the electronic device 10 runs software 38 stored in the memory 18 to enhance the detection of a fraudulent identity document in an image.

In step S1, the software 38 executed by the processor 16 causes the electronic device 10 to receive an image of an identity document associated with a user including one or more background objects 74. The image could be from the camera 26 or could be transmitted via the network 14 from a capture device such as the camera 26 external to the electronic device 10. In step S2, the software 38 executed by the processor 16 causes the electronic device 10 to determine the size and orientation of the at least one background object based on the received image. The electronic device 10 may also determine the identity of the background objects 74, for example, using computer vision techniques.

Next, in step S3, the software 38 executed by the processor 16 causes the electronic device 10 to extract information about the received image from the received image. Information about the image itself includes, but is not limited to, spatial data and color information. More specifically, information about the image itself includes, but is not limited to, the latitudinal and longitudinal coordinates of the image, the time zone in which the image was captured, a time stamp indicating a date and time the image was captured, and information related to the content and context of the image. Information related to the content and context of the image can include, but is not limited to, the resolution, pixel density, and image format of the image.

In step S4, the software 38 executed by the processor 16 causes the electronic device 10 to extract information from the received image about a capture device that captured the received image. The capture device can be, for example, another electronic device 10 included in the system 100. Information about the electronic device 10 that captured the image includes the type and/or model of the device used to capture the image. Moreover, information about the electronic device may include positional information of the electronic device during capture of the image, and movement information of the electronic device during capture of the image.

Positional information may include, but is not limited to, an angle from which the electronic device captured the image, the height of the electronic device above the identity document, the latitude and longitude of the electronic device, and the altitude of the electronic device.

Movement information may include, but is not limited to, acceleration, velocity, and orientation of the electronic device with respect to the identity document 42 while capturing the image.

Next, in step S5, the software 38 executed by the processor 16 causes the electronic device 10 to compare each of the size and orientation of the one or more background objects, the extracted received image data information, and the extracted capture device information against corresponding information in record data of the user. For example, the size and orientation of the background objects may be compared against the size and orientation of respective background objects in the user data record. When a background object 74 is, for example, a pencil, the size and orientation of the pencil can be compared against the size and orientation of a pencil in the record data of the user.

Similarly, the extracted received image data information may be compared against the same information in the user data record. For example, the latitudinal and longitudinal coordinates of the received image can be compared against the latitudinal and longitudinal coordinates of an image in the user's data record. The extracted capture device information may be compared against the same information in the user data record. For example, the altitude of the capture device extracted from the received image may be compared against the altitude information in the user data record.

An exact match between the information being compared is not necessary. The compared information should be similar. Thus, in step S6, the software 38 executed by the processor 16 causes the electronic device 10 to calculate a similarity score for each comparison. Each similarity score reflects the similarity between the compared information.

Next in step S7, the software 38 executed by the processor 16 causes the electronic device 10 to determine whether each similarity score satisfies a threshold value by comparing each of the similarity scores against the threshold value. If all the similarity scores satisfy the threshold value, in step S8, the software 38 executed by the processor 16 causes the electronic device 10 to determine the identity document might be fraudulent and thus deems the identity document in the received image to be fraudulent. However, if one or more of the similarity scores fails to satisfy the threshold value, in step S9, the software 38 executed by the processor 16 causes the electronic device 10 to determine the identity document is likely genuine thus deems the identity document in the received image to be genuine.

Each similarity score may satisfy the threshold value when the respective similarity score is equal to or greater than the threshold value, greater than the threshold value, less than the threshold value, or less than or equal to the threshold value depending on the design of the algorithm. The threshold value may alternatively include multiple threshold values, each of which is required to be satisfied by a respective similarity score to satisfy the threshold value.

Although the example method and algorithm described herein deems the identity document in the received image to be fraudulent or genuine based on comparing similarity scores against a threshold value in step S7, alternatively, or additionally, the genuineness of the identity document in the received image data may be determined using cryptographic image hashes. For example, in step S7, the software 38 executed by the processor 16 may alternatively, or additionally, cause the electronic device 10 to calculate a cryptographic image hash of the received image and to compare the calculated image hash against a record cryptographic image hash of the user.

If all the hashes match, in step S8, the software 38 executed by the processor 16 could cause the electronic device 10 to determine the identity document might be fraudulent and thus deem the identity document in the received image to be fraudulent. However, if one or more of the hashes fails to match, in step S8, the software 38 executed by the processor 16 could cause the electronic device 10 to determine the identity document is likely genuine thus deem the identity document in the received image to be genuine.

Although the example method and algorithm are described herein as being conducted by the electronic device 10, it is contemplated by the present disclosure that the server 12 may alternatively conduct the example method and algorithm. For example, the electronic device 10 may capture the identity document image and transmit the captured image to the server 12 via the network 14. The software executed by a processor in the server 12 could cause the server 12, in step S1, to receive the captured identity document image and to conduct the operations described in steps S2 to S9.

Using the method and algorithm for enhancing detection of a fraudulent identity document in an image as described herein enables quickly determining whether an identity document in an image might be fraudulent. As a result, the method and algorithm facilitate enhancing the accuracy and trustworthiness of identity document review results while enhancing security and facilitating a reduction in review costs.

It is contemplated by the present disclosure that the example methods and algorithms described herein may be conducted entirely by the electronic device 10; partly by the electronic device 10 and partly by the server 12; entirely by the server 12, or by any other combination of other servers (not shown), electronic devices (not shown), or computers (not shown) operable to communicate with the electronic device 10 and the server 12 via the network 14. Furthermore, data described herein as being stored in the electronic device 10 may alternatively, or additionally, be stored in the server 12 or any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing detection of a fraudulent identity document in an image comprising the steps of:
   receiving, by an electronic device, an image of an identity document associated with a user including at least one background object;
   determining a size and orientation of the at least one background object based on the received image;
   extracting information about the received image from the received image;
   extracting information from the received image about a capture device that captured the received image;
   comparing each of the size and orientation of the at least one background object, the extracted received image information, and the extracted capture device information against corresponding information in record data of the user;
   for each comparison of said comparisons, calculating a similarity score;
   for each similarity score of the similarity scores, determining whether the similarity score satisfies a threshold value; and
   in response to determining each similarity score of the similarity scores satisfies the threshold value, deeming the identity document in the received image to be fraudulent.

2. The method according to claim 1, further comprising deeming the identity document in the received image to be genuine in response to determining at least one of the similarity scores fails to satisfy the threshold value.

3. The method according to claim 1, said extracting information about the received image step comprising extracting at least one of:
   latitudinal and longitudinal coordinates of the received image;
   a time zone in which the received image was captured;
   a time stamp indicating a date and time the received image was captured; and
   metadata associated with content and context of the received image.

4. The method according to claim 1, said extracting information from the received image about the capture device step comprising extracting at least one of:
   a type and model of the capture device used to capture the received image;
   positional information of the capture device during capture of the received image;
   movement information of the capture device during capture of the received image; and
   environmental conditions during capture of the received image.

5. The method according to claim 1, further comprising storing the size and orientation of the at least one background object, the extracted received image information, and the extracted capture device information.

6. The method according to claim 1, said determining the size and orientation of the at least one background object step comprising identifying the at least one background object.

7. The method according to claim 1, further comprising the steps of:
   calculating a cryptographic image hash of the received image;

comparing the calculated cryptographic image hash against a record cryptographic image hash of the user; and determining the received image is a replay of a record image when the calculated cryptographic image hash and the record cryptographic image hash match.

8. The method according to claim 1, said extracting information from the received image about the capture device step comprising extracting data including environmental data, location data, movement data, imaging data, audio data, proximity data, magnetic data, power data, and storage data from sensors in the capture device, wherein the extracted data was captured by the capture device while capturing the received image.

9. The method according to claim 1, wherein the extracted received image information comprises spatial data and color information.

10. The method according to claim 1, wherein the extracted capture device information comprises a type of capture device.

11. An electronic device for enhancing detection of a fraudulent identity document in an image comprising:

a processor; and a memory configured to store data, said electronic device being associated with a network and said memory being in communication with said processor and having instructions stored thereon which, when read and executed by said processor, cause said electronic device to:

receive an image of an identity document associated with a user including at least one background object;

determine a size and orientation of the at least one background object based on the received image;

extract information about the received image from the received image;

extract information from the received image about a capture device that captured the received image;

compare each of the size and orientation of the at least one background object, the extracted received image information, and the extracted capture device information against corresponding information in record data of the user;

for each comparison of said comparisons, calculate a similarity score;

for each similarity score of the similarity scores, determine whether the similarity score satisfies a threshold value; and in response to determining each similarity score of the similarity scores satisfies the threshold value, deem the identity document in the received image to be fraudulent.

12. The electronic device according to claim 11, wherein the instructions, when read and executed by said processor, further cause said electronic device to deem the identity document in the received image to be genuine in response to determining at least one of the similarity scores fails to satisfy the threshold value.

13. The electronic device according to claim 11, wherein the extracted received image information includes at least one of:

latitudinal and longitudinal coordinates of the received image;

a time zone in which the received image was captured;

a time stamp indicating a date and time the received image was captured; and metadata associated with content and context of the received image.

14. The electronic device according to claim 11, wherein the extracted capture device information includes at least one of:

a type and model of the capture device used to capture the received image;

positional information of the capture device during capture of the received image;

movement information of the capture device during capture of the received image; and environmental conditions during capture of the received image.

15. The electronic device according to claim 11, wherein the instructions, when read and executed by said processor, further cause said electronic device to store the size and orientation of the at least one background object, the extracted image information, and the extracted capture device information.

16. The electronic device according to claim 11, wherein the instructions, when read and executed by said processor, further cause said electronic device to identify the at least one background object from the size and orientation of the at least one background object.

17. The electronic device according to claim 11, wherein the instructions, when read and executed by said processor, further cause said electronic device to:

calculate a cryptographic image hash of the received image;

compare the calculated cryptographic image hash against a record cryptographic image hash of the user; and determine the received image is a replay of a record image when the calculated cryptographic image hash and the record cryptographic image hash match.

18. The electronic device according to claim 11, wherein the capture device includes sensors and the instructions, when read and executed by said processor, further cause said electronic device to extract data including environmental data, location data, movement data, imaging data, audio data, proximity data, magnetic data, power data, and storage data from the sensors, wherein the extracted data was captured by the capture device while capturing the received image.

19. The electronic device according to claim 11, wherein the extracted received image information comprises spatial data and color information.

20. The electronic device according to claim 11, wherein the extracted capture device information comprises a type of capture device.

* * * * *